(12) United States Patent
Kibol et al.

(10) Patent No.: US 8,042,363 B2
(45) Date of Patent: Oct. 25, 2011

(54) COMPOSITION AND METHOD FOR PRODUCING CONTINUOUS BASALT FIBRE

(76) Inventors: Viktor F. Kibol, Kiev (UA); Sunao Nakanoo, Tokyo (JP); Alexandr B. Biland, Kiev (UA); Roman V. Kibol, Kiev (UA)

( * ) Notice: Subject to any disclaimer, the term of this patent is extended or adjusted under 35 U.S.C. 154(b) by 195 days.

(21) Appl. No.: 12/063,796

(22) PCT Filed: Dec. 25, 2006

(86) PCT No.: PCT/UA2006/000075
§ 371 (c)(1),
(2), (4) Date: Feb. 14, 2008

(87) PCT Pub. No.: WO2007/136360
PCT Pub. Date: Nov. 29, 2007

(65) Prior Publication Data
US 2008/0277818 A1    Nov. 13, 2008

(30) Foreign Application Priority Data
May 19, 2006   (UA) .............................. A 2006 05493

(51) Int. Cl.
B29C 47/00   (2006.01)
C04B 35/10   (2006.01)

(52) U.S. Cl. ............... 65/376; 65/474; 65/475; 65/479; 264/211.11; 501/27; 501/25; 501/36; 501/69; 501/38; 428/141; 428/357

(58) Field of Classification Search ............. 264/211.11; 65/474, 475, 479, 2, 5, 376; 501/35, 36, 501/27, 25, 69, 38; 428/141, 357
See application file for complete search history.

(56) References Cited

U.S. PATENT DOCUMENTS

| 3,508,934 | A | * | 4/1970 | Ware ........................ 106/18.11 |
| 3,986,988 | A | * | 10/1976 | Sedlak et al. ................ 521/102 |
| 4,818,221 | A | | 4/1989 | Besne et al. |
| 5,614,449 | A | * | 3/1997 | Jensen ........................... 501/38 |
| 6,099,910 | A | * | 8/2000 | Woodside ..................... 427/386 |
| 6,125,660 | A | * | 10/2000 | Gorobinskaya et al. ........ 65/474 |
| 6,986,859 | B2 | * | 1/2006 | Mazany et al. ............... 264/234 |
| 2003/0068488 | A1 | * | 4/2003 | Tsugawa et al. .............. 428/325 |
| 2003/0082380 | A1 | * | 5/2003 | Hager et al. ................. 428/375 |
| 2004/0065233 | A1 | * | 4/2004 | Cook et al. ................... 106/805 |
| 2006/0287186 | A1 | * | 12/2006 | Kamiya et al. ................. 501/36 |

FOREIGN PATENT DOCUMENTS

| EP | 0869922 | | 10/1998 |
| EP | 1736449 | A1 * | 12/2006 |
| RU | 2104250 | | 2/1998 |
| RU | 2118300 | | 8/1998 |
| RU | 2170218 | | 7/2001 |
| SU | 1261923 | | 10/1986 |
| SU | 1392041 | A * | 4/1988 |

OTHER PUBLICATIONS

Friedrich M, Schulze A, Prosch G, Walter C, Weikert D, Binh NM, Zahn DRT, "Investigation of Chemically Treated Basalt and Glass Fibres", 2000, Mikrochimica Acta, Acta 133, pp. 171-174.*
Sim J, Park C, Moon DY, 'Characteristics of basalt fiber as a strengthening material for concrete structures', 2005, Journal of Composites, Elsevier, vol. 36, pp. 504-512.*

* cited by examiner

*Primary Examiner* — Khanh Nguyen
*Assistant Examiner* — Keith T Aziz
(74) *Attorney, Agent, or Firm* — DeLio & Peterson, LLC; Peter W. Peterson

(57) ABSTRACT

The invention relates to producing continuous organic fibers by stretching from molten minerals. These fibers can be used for producing heat resistant threads, rovings, cut fibers, fabrics, composite materials and products based thereon. The inventive glass has the following chemical composition in mass percentage: 15.9-18.1 $Al_2O_3$, 0.75-1.2 $TiO_2$, 7.51-9.53 $Fe_2O_3$+FeO, 6.41-8.95 CaO, 2.5-6.4 MgO, 1.6-2.72 $K_2O$, 3.3-4.1 $Na_2O$, 0.23-0.5 $P_2O_5$, 0.02-0.15 $SO_3$, 0.12-0.21 MnO, 0.05-0.19 BaO, impurities up to 1.0, the rest being $SiO_2$. The inventive method consists in loading a ground composition in a melting furnace, in melting said composition, in homogenizing a melt, in consequently stabilizing the melt in the melting furnace feeder, in drawing and oiling the fiber and in winding it on a spool. Prior to loading, the composition is held in an alkali solution for 15-20 minutes, and is then washed with flowing water for 20-30 minutes and dried. After having been washed with flowing water, the dried composition is loaded into the melting furnace.

11 Claims, No Drawings

COMPOSITION AND METHOD FOR PRODUCING CONTINUOUS BASALT FIBRE

BACKGROUND OF THE INVENTION

Field of the Invention

The proposed inventions pertain to technology of continuous inorganic fibers manufacturing, preferably, by way of drawing from melted minerals. Such continuous inorganic fibers may be used in production of heat-resistant threads, rovings, cut fibers, fabrics, composition materials and products based on such materials.

Production of fibrous materials based on mineral, glass and other fibers is intensively developing in CIS and other countries. Nevertheless, the production volume increase is restrained by growing technical demands to such materials and also by the deficit of raw materials.

Meeting the increasing needs in fibrous materials is predetermined by drastic increase of their quality. With a view to the above, in CIS prevailing production type is production of basalt fibers and materials based on such fibers with rocks (basalt, gabbro-diabases, porphyrites, etc.) used as one-component raw material.

Using basalt fibers as a raw material enables production of materials replacing asbestos, metal, wood, etc.

The most similar to the proposed composition in terms of a number of essential features is the composition for production of continuous basalt fiber containing the mixture of silicon ($SiO_2$), aluminum ($Al_2O_3$), titan ($TiO_2$), iron ($Fe_2O_3$ and FeO), calcium (CaO), magnesium (MgO), manganese (MnO) oxides and also admixtures (RF Patent No. 02118300, IPC 6 C03B 37/02, 1998). Average elements of the initial composition are presented in Table 1.

TABLE 1

| Comp. | Average elements of the initial composition | | | | | | | | | |
|---|---|---|---|---|---|---|---|---|---|---|
| No. | Na | Mg | Al | Si | K | Ca | Ti | Mn | Fe | P |
| 1 | 6.325 | 1.970 | 17.833 | 55.903 | 4.558 | 4.672 | 1.582 | 0.160 | 6.997 | 0.000 |
| 2 | 5.083 | 7.932 | 14.127 | 46.154 | 2.320 | 4.697 | 1.343 | 0.396 | 16.461 | 1.512 |
| 3 | 5.877 | 2.773 | 17.493 | 53.716 | 3.923 | 4.867 | 1.299 | 0.098 | 8.276 | 1.680 |
| 4 | 4.357 | 3.187 | 17.660 | 52.501 | 3.927 | 5.515 | 1.701 | 0.155 | 8.541 | 1.953 |
| 5 | 4.404 | 3.470 | 15.324 | 51.606 | 2.810 | 7.681 | 1.852 | 0.185 | 9.223 | 2.944 |

The drawback of the described composition is insufficient strength of continuous fibers produced. This is due to high upper limit of crystallization of the composition (1245 to 1290° C.), which prevents stable process of continuous basalt fiber formation.

In terms of a number of essential features, the closest method to the proposed one is the method of continuous basalt fibers production comprising operations of the crushed composition loading into the melting furnace, melting, melt homogenization, subsequent stabilization of the melt in the melting furnace feeder, drawing, lubrication and winding the fiber onto the reel (RF Patent No. 02118300, IPC 6 C03B 37/02, 1998).

The drawback of the described method is insufficient strength and chemical stability of continuous fibers produced in this way, which is due to narrow temperature range of fibers forming. Difference between fiber forming temperature and upper crystallization limit is 70 to 100° C. on the average, which causes instability of continuous fiber drawing due to primary crystallization occurring is such temperature range. Such primary crystallization causes thread breakages. As seen from the practice, the temperature of forming should be at least 110° C. above upper crystallization limit.

The proposed inventions aim at providing the means for obtaining stronger and chemically more stable fibers by way of creating the conditions for decreasing the number of defects on the fiber surfaces.

This objective is attained by the proposed composition for production of continuous basalt fiber containing the mixture of silicon ($SiO_2$), aluminum ($Al_2O_3$), titan ($TiO_2$), iron ($Fe_2O_3$ and FeO), calcium (CaO), magnesium (MgO), manganese (MnO) oxides and admixtures and also, according to the present invention, this composition further contains potassium ($K_2O$), sodium ($Na_2O$), barium (BaO) oxides with the following components ratio (in mass %):

| | |
|---|---|
| $Al_2O_3$ | 15.90-18.10 |
| $TiO_2$ | 0.75-1.20 |
| $Fe_2O_3$ + FeO | 7.51-9.53 |
| CaO | 6.41-8.95 |
| MgO | 2.50-6.40 |
| $K_2O$ | 1.60-2.72 |
| $Na_2O$ | 3.30-4.10 |
| $P_2O_5$ | 0.23-0.50 |
| $SO_3$ | 0.02-0.15 |
| MnO | 0.12-0.21 |
| BaO | 0.05-0.19 |
| admixtures, | up to 1.00 |
| $SiO_2$ | the rest. |

The objective is also attained by the proposed method, which, like the known method of continuous basalt fibers production, comprises operations of the crushed composition loading into the melting furnace, melting, melt homogenization, subsequent stabilization of the melt in the melting furnace feeder, drawing, lubrication and winding the fiber onto the reel, and, according to the invention, the composition is held in alkaline solution during 15 to 20 minutes, then washed by running water during 20 to 30 minutes and loaded into the melting furnace after such washing.

The feature of the proposed method is the use of sodium hydroxide (NaOH) and potassium hydroxide (KOH) solution in the range of about 0.1 to 0.5 N concentration as the alkaline solution.

The invention idea is in creation of conditions for obtaining melt with pH in the range of about 5 to 7. This is because our experiments show that such melt pH ensures producing of homogenous chemical composition. Acidic melt components react with alkaline components and give chemically neutral melt. Gas microbubbles do not appear in such relatively neutral melt during cooling, unlike conventional rock melts. Thus, the number of surface defects on the fibers produced is much less, therefore, diameter of elementary fibers may be smaller without compromising the strength. Adding alkali metals oxides to the known composition of the furnace charge in the above amount promotes producing of chemically neutral melt composition. Thus, with $K_2O$ and $Na_2O$ in amount over 4.1 mass % and less than 1.6 mass % the melt acidity is changed causing chemical reactions in the melt and microbubbles generation. BaO presence in the melt in amount of 0.05 to 0.19 mass % as well as other admixtures presence increases melt diathermancy, thus forming interval becomes larger and conditions of fiber forming are improved, surface defects become less, and conditions for compressed surface layer are created, while such compressed layer prevents stretching forces appearance under bending loads. The latter is attained by changing the composition of the surface layer by way of substituting alkali ions with a big radius by ions having smaller radius and vice-versa. The oxides listed among the admixtures are present in the composition of the fiber being strengthened for ion exchange purposes. In addition, for example, presence of zinc oxide (ZnO) in the proposed composition as an admixture results in formation of acid resistant solid solution together with aluminum oxide ($Al_2O_3$). Acid resistance is also improved by phosphorus oxides and other admixtures, i.e. oxides of the elements of the III and V groups in Mendeleev's Periodic Table of the Elements. By experimental way the authors have found that the substances with structures similar to precipitates structures are formed on the fibers obtained. This is occurring in case of treating the furnace charge of the proposed composition by alkaline solution prior to its loading to the melting furnace. Such structures essentially increase the fibers surface strength.

Also, by way of experiments, the authors have found the processing mode parameters for the proposed composition, beginning from its loading to the melting furnace until continuous basalt fibers production. Thus, in case of holding the proposed composition (furnace charge) in alkaline solution for less than 15 minutes, the effect of the proposed method is not practically visible. Holding the furnace charge in alkaline solution for more than 20 minutes is not justified economically.

Furnace charge is washed in the running water during 20 to 30 minutes, because this time is enough to remove the alkaline solution which otherwise may cause corrosion of the melting furnace walls.

The proposed composition contains the following admixtures (mass %):

| | |
|---|---|
| $Cr_2O_3$ | 0.010-0.0315 |
| $Co_2O_3$ | 0.0005-0.0047 |
| NiO | 0.0079-0.0091 |
| CuO | 0.0065-0.0087 |
| ZnO | 0.0083-0.0159 |
| $Ga_2O_3$ | 0.0029-0.0051 |
| $Rb_2O$ | 0.0049-0.0095 |
| SrO | 0.0585-0.0923 |
| $ZrO_2$ | 0.0127-0.0173 |
| $Nb_2O_5$ | 0.0011-0.0019 |
| $V_2O_5$ | 0.029-0.043, |
| F-containing compounds | 0.06-0.11 |
| Cl-containing compounds | 0.0270-0.0520, | their amount practically has no effect on the quantity of structures similar to precipitates appearing on the fiber surfaces.

Sodium hydroxide (NaOH) and potassium hydroxide (KOH) solutions have approximately the same chemical characteristics. But the furnace charge material structure is not homogenous. Thus, some of its elements react more actively with sodium hydroxide (NaOH), while others react more actively with potassium hydroxide (KOH). The amounts of sodium hydroxide (NaOH) and potassium hydroxide (KOH) in solution are approximately the same. Sodium hydroxide (NaOH) and potassium hydroxide (KOH) solution concentration is in the range of about 0.1 to 0.5 N. Using more concentrated solutions is not economically justified.

Implementation of the proposed inventions results in producing of the stronger continuous basalt fiber. The continuous fibers so obtained also possess higher heat and acid resistance.

The method is realized as follows.

The above composition, ground to dispersion level in the range of about 1.0 to 5.0 mm, was charged into a tank filled with sodium hydroxide (NaOH) and potassium hydroxide (KOH) solution with concentration 0.5 N and the temperature in the range of about +20° to +60° C. Such ground composition was held in the solution during 15 to 20 minutes under continuous agitation. Then the solution was poured out and the ground charge was washed by running water during 30 minutes. The charge was then dried by air forced through the charge. Treated and dried charge was loaded into the melting furnace with temperature set at 1400-2000° C. Melt was produced from the charge. This melt was left to stay for some time for homogenization. Homogenized melt was fed to fiber forming zone, which is a feeder and spinnerets. The temperature in the forming zone was maintained at the level exceeding crystallization temperature of the melt produced. The melt came out of the spinnerets in the form of drops forming cones, which separated from the spinnerets after some increase in mass and formed the fibers. Fibers drawing was performed without stops and delays. To prevent mutual friction and adhesion of the fibers, they were lubricated on the roller lubricating unit. Continuous fiber forming was stable.

Table 2 shows that the upper crystallization limit ($T_{ucl}$) was lower for the proposed composition compared to the prototype, while fiber forming interval was larger.

Also, experimental evaluation of chemical resistance of the fibers produced using hydrochloric acid (HCl) solution proved that these fibers possess higher acid resistance than the fibers produced according to prototype method.

The continuous fibers chemical resistance to acid and alkali solutions was determined by measuring the mass loss from the 5000 sq.cm surface after 3 hours of boiling (Table 3).

TABLE 2

| | Composition of fiber | |
|---|---|---|
| Melt and fibers technological properties | produced according to the proposed method | produced according to the prototype method |
| Upper crystallization limit temperature, $T_{ucl}$, ° C. | 1210-1230 | 1240-1290 |
| Forming temperature interval,, ° C. | 1320-1430 | 1350-1430 |
| Elementary fiber average diameter, μm | 7 ± 2 | 8.5 |
| Tensile strength, MPa | 2250-3200 | 2240-3110 |

TABLE 3

| Medium | Resistance of fibers produced from the proposed composition, % | Resistance of fibers produced from the prototype composition, % |
|---|---|---|
| 2N HCL solution | 97.1 | 91.0 |
| 2N NaOH solution | 98.2 | 96.8 |
| $Ca(OH)_2$ | 99.7 | — |

Table 3 shows that continuous fibers produced from the proposed composition and by the proposed method possess high resistance to both acids and saturated alkaline solution ($Ca(OH)_2$). Therefore they may be widely used, for example, in filter materials, composite reinforcing fillers, etc. resistant to aggressive media.

Information Sources:

1. RU 2018491 C1, 28.02.79
2. SU 649670 A, 03.03.79

The invention claimed is:

1. Composition for production of continuous basalt fiber containing the mixture of silicon ($SiO_2$), aluminum ($Al_2O_3$), titan ($TiO_2$), iron ($Fe_2O_3$ and FeO), calcium (CaO), magnesium (MgO), manganese (MnO) oxides and admixtures, wherein this composition further contains potassium ($K_2O$), sodium ($Na_2O$), barium (BaO) oxides with the following components ratio (in mass %):

| | |
|---|---|
| $Al_2O_3$ | 15.90-18.10 |
| $TiO_2$ | 0.75-1.20 |
| $Fe_2O_3$ + FeO | 7.51-9.53 |
| CaO | 6.41-8.95 |
| MgO | 2.50-6.40 |
| $K_2O$ | 1.60-2.72 |
| $Na_2O$ | 3.30-4.10 |
| $P_2O_5$ | 0.23-0.50 |
| $SO_3$ | 0.02-0.15 |
| MnO | 0.12-0.21 |
| BaO | 0.05-0.19 |
| admixtures, | up to 1.00 |
| $SiO_2$ | the rest, | the fiber composition having an upper crystallization limit temperature $T_{ucl}$ in the range of 1210° C. to 1230° C.

2. Method of continuous basalt fiber production from a crushed composition containing a mixture of silicon ($SiO_2$), aluminum ($Al_2O_3$), titan ($TiO_2$), iron ($Fe_2O_3$ and FeO), calcium (CaO), magnesium (MgO), manganese (MnO) oxides and admixtures, wherein the composition further contains potassium ($K_2O$), sodium ($Na_2O$), barium (BaO) oxides with the following components ratio (in mass %):

| | |
|---|---|
| $Al_2O_3$ | 15.90-18.10 |
| $TiO_2$ | 0.75-1.20 |
| $Fe_2O_3$ + FeO | 7.51-9.53 |
| CaO | 6.41-8.95 |
| MgO | 2.50-6.40 |
| $K_2O$ | 1.60-2.72 |
| $Na_2O$ | 3.30-4.10 |
| $P_2O_5$ | 0.23-0.50 |
| $SO_3$ | 0.02-0.15 |
| MnO | 0.12-0.21 |
| BaO | 0.05-0.19 |
| admixtures, | up to 1.00 |
| $SiO_2$ | the rest, | the method comprising operations of holding the crushed composition in alkaline solution during 15 to 20 minutes, then washing the crushed composition by running water during 20 to 30 minutes, drying and loading the crushed composition into the melting furnace, melting, melt homogenization, subsequent stabilization of the melt in a melting furnace feeder, drawing, lubrication and winding the fiber onto the reel, the fiber composition having an upper crystallization limit temperature $T_{ucl}$ in the range of 1210° C. to 1230° C.

3. Method of continuous basalt fiber production according to claim 2, wherein sodium hydroxide (NaOH) and potassium hydroxide (KOH) solution in the range of about 0.1 to 0.5 N concentration is used as the alkaline solution.

4. Method of continuous basalt fiber production according to claim 3, wherein the composition has a pH in the range of 5 to 7 during melting.

5. Composition for production of continuous basalt fiber according to claim 1, wherein the composition has a pH in the range of 5 to 7 during melting.

6. Method of continuous basalt fiber production from a crushed composition containing a mixture of silicon ($SiO_2$), aluminum ($Al_2O_3$), titan ($TiO_2$), iron ($Fe_2O_3$ and FeO), calcium (CaO), magnesium (MgO), manganese (MnO) oxides and admixtures, wherein the composition further contains potassium ($K_2O$), sodium ($Na_2O$), barium (BaO) oxides, the method comprising operations of holding the crushed composition in alkaline solution, then washing the crushed composition by running water, drying and loading the crushed composition into the melting furnace, melting, melt homogenization, subsequent stabilization of the melt in a melting furnace feeder, drawing, lubrication and winding the fiber onto the reel, the fiber composition having an upper crystallization limit temperature $T_{ucl}$ in the range of 1210° C. to 1230° C.

7. Method of continuous basalt fiber production according to claim 6, wherein the crushed composition is held in alkaline solution during 15 to 20 minutes, then the crushed composition is washed by running water during 20 to 30 minutes.

8. Method of continuous basalt fiber production according to claim 6, wherein sodium hydroxide (NaOH) and potassium hydroxide (KOH) solution in the range of about 0.1 to 0.5 N concentration is used as the alkaline solution.

9. Method of continuous basalt fiber production according to claim 6, wherein the composition has a pH in the range of 5 to 7 during melting.

10. Method of continuous basalt fiber production according to claim 7, wherein sodium hydroxide (NaOH) and potassium hydroxide (KOH) solution in the range of about 0.1 to 0.5 N concentration is used as the alkaline solution.

11. Method of continuous basalt fiber production according to claim 8, wherein the composition has a pH in the range of 5 to 7 during melting.

* * * * *